United States Patent
Strong

(10) Patent No.: US 10,152,804 B2
(45) Date of Patent: Dec. 11, 2018

(54) SYSTEM AND METHOD FOR DYNAMIC COLOR SCHEME APPLICATION

(71) Applicant: SMUGMUG, INC., Mountain View, CA (US)

(72) Inventor: Brian Strong, San Jose, CA (US)

(73) Assignee: SMUGMUG, INC., Mountain View, CA (US)

( * ) Notice: Subject to any disclaimer, the term of this patent is extended or adjusted under 35 U.S.C. 154(b) by 233 days.

(21) Appl. No.: 15/042,506

(22) Filed: Feb. 12, 2016

(65) Prior Publication Data

US 2016/0239197 A1    Aug. 18, 2016

Related U.S. Application Data

(60) Provisional application No. 62/116,254, filed on Feb. 13, 2015.

(51) Int. Cl.
*G06F 3/0485* (2013.01)
*G06T 11/00* (2006.01)
*G09G 5/02* (2006.01)

(52) U.S. Cl.
CPC .......... *G06T 11/001* (2013.01); *G06F 3/0485* (2013.01); *G09G 5/02* (2013.01); *G09G 2354/00* (2013.01)

(58) Field of Classification Search
CPC .................................................... G06F 3/0485
USPC ........................................................ 715/765
See application file for complete search history.

(56) References Cited

U.S. PATENT DOCUMENTS

| | | | |
|---|---|---|---|
| 5,249,263 A | 9/1993 | Yanker | |
| 5,473,738 A | 12/1995 | Hamlin et al. | |
| 5,586,236 A | 12/1996 | Quarato | |
| 5,867,161 A * | 2/1999 | Walsh | G06F 3/0481 |
| | | | 707/E17.142 |
| 6,067,086 A * | 5/2000 | Walsh | G06F 3/0481 |
| | | | 707/E17.142 |
| 6,104,391 A | 8/2000 | Johnston, Jr. et al. | |
| 6,518,981 B2 | 2/2003 | Zhao et al. | |

(Continued)

FOREIGN PATENT DOCUMENTS

WO    9220024 A1    11/1992

OTHER PUBLICATIONS

Freebiesbug.com, "Adaptive Background—JQuery plugin", available at <<https://freebiesbug.com/code-stuff/adaptive-background-jquery-plugin>>, archived on Jan. 31, 2014 at wayback machine <<http://web.archived.org>, 2 pages.*

(Continued)

*Primary Examiner* — Reza Nabi
*Assistant Examiner* — Daniel Rodriguez
(74) *Attorney, Agent, or Firm* — Patterson + Sheridan LLP

(57) ABSTRACT

A software application platform which provides a user with the ability to customize, via the selection of a single color, the color for one or more user interface elements, such as the skin color, included on a graphical user interface in which the selected color is optimized by the application in real time based upon the average pixel hue of all image pixels displayed on the graphical user interface at any given time, and is further dynamically applied and displayed as a skin color surrounding the image pixels on the graphical user interface is disclosed.

21 Claims, 8 Drawing Sheets

(56) References Cited

U.S. PATENT DOCUMENTS

| | | | |
|---|---|---|---|
| 6,809,741 B1* | 10/2004 | Bates | G06F 3/0481 345/597 |
| 7,486,300 B2 | 2/2009 | Rose | |
| 7,970,206 B2 | 6/2011 | Harris et al. | |
| 8,154,561 B1 | 4/2012 | Voliter et al. | |
| 8,311,355 B2 | 11/2012 | Brunner et al. | |
| 8,584,043 B2* | 11/2013 | Cho | G06F 3/04817 715/814 |
| 9,785,308 B1* | 10/2017 | Tseng | G06F 1/1637 |
| 9,841,886 B2* | 12/2017 | Nabeshima | G06F 3/0485 |
| 2002/0167527 A1 | 11/2002 | Senn et al. | |
| 2005/0188326 A1* | 8/2005 | Ikeda | G06T 11/60 715/788 |
| 2006/0132871 A1* | 6/2006 | Beretta | H04N 1/62 358/518 |
| 2006/0132872 A1* | 6/2006 | Beretta | H04N 1/6052 358/518 |
| 2006/0227149 A1 | 10/2006 | Cain | |
| 2007/0195343 A1 | 8/2007 | Yoneda | |
| 2007/0257933 A1 | 11/2007 | Klassen et al. | |
| 2008/0062192 A1 | 3/2008 | Voliter et al. | |
| 2008/0079965 A1 | 4/2008 | Jackson | |
| 2009/0003692 A1 | 1/2009 | Pettersson et al. | |
| 2009/0073182 A1 | 3/2009 | Ballerini | |
| 2009/0164944 A1* | 6/2009 | Webster | G06F 3/0489 715/838 |
| 2009/0183122 A1 | 7/2009 | Webb et al. | |
| 2009/0204913 A1 | 8/2009 | Kawano et al. | |
| 2009/0204929 A1* | 8/2009 | Baurmann | H04N 5/44543 715/836 |
| 2009/0326383 A1* | 12/2009 | Barnes | A61B 5/0059 600/476 |
| 2010/0014131 A1 | 1/2010 | Cho | |
| 2010/0050113 A1* | 2/2010 | Winter | G06F 3/0485 715/784 |
| 2010/0073393 A1 | 3/2010 | Saha et al. | |
| 2010/0077330 A1 | 3/2010 | Kaplan et al. | |
| 2010/0110101 A1 | 5/2010 | Relyea et al. | |
| 2010/0223568 A1* | 9/2010 | Quek | G06T 11/60 715/765 |
| 2011/0035708 A1* | 2/2011 | Damale | G06F 3/0485 715/863 |
| 2011/0074807 A1 | 3/2011 | Inada et al. | |
| 2011/0184950 A1* | 7/2011 | Skaff | G06F 17/30265 707/737 |
| 2012/0026186 A1 | 2/2012 | Irace | |
| 2012/0027294 A1* | 2/2012 | Krolczyk | G06T 11/60 382/165 |
| 2012/0075328 A1* | 3/2012 | Goossens | G09G 5/06 345/592 |
| 2012/0096380 A1 | 4/2012 | Wagner | |
| 2012/0105467 A1* | 5/2012 | Chao | G06Q 10/10 345/589 |
| 2012/0154420 A1* | 6/2012 | Calandrino | G09G 5/02 345/589 |
| 2012/0174008 A1* | 7/2012 | Wakabayashi | G06F 3/0237 715/768 |
| 2012/0174034 A1* | 7/2012 | Chae | G06F 3/04883 715/835 |
| 2012/0212501 A1* | 8/2012 | Berkland | G06F 9/451 345/593 |
| 2012/0306743 A1* | 12/2012 | Klassen | G06T 11/001 345/156 |
| 2012/0313962 A1* | 12/2012 | Hsu | G06F 3/04817 345/593 |
| 2013/0069962 A1* | 3/2013 | Nealer | H04M 1/72544 345/522 |
| 2013/0321444 A1* | 12/2013 | Efrati | G09G 5/346 345/589 |
| 2014/0013278 A1* | 1/2014 | Wu | G06F 3/0482 715/835 |
| 2014/0132637 A1* | 5/2014 | Yang | G06T 11/60 345/649 |
| 2014/0184471 A1* | 7/2014 | Martynov | G06F 3/1423 345/1.2 |
| 2015/0046869 A1* | 2/2015 | Nabeshima | G06F 3/0485 715/784 |
| 2015/0170606 A1* | 6/2015 | Jureidini | G09G 5/026 345/592 |
| 2015/0205498 A1* | 7/2015 | Levi | G06F 3/04842 715/763 |
| 2015/0205505 A1* | 7/2015 | Conn | G06F 3/0481 715/765 |
| 2015/0286372 A1* | 10/2015 | Swindell | G06F 3/0481 715/762 |
| 2015/0355784 A1* | 12/2015 | Vaillant | G06F 3/0412 345/173 |
| 2016/0117849 A1* | 4/2016 | Qian | G06F 9/44594 345/593 |
| 2016/0133030 A1* | 5/2016 | Manuja | G06T 11/001 345/594 |
| 2016/0210271 A1* | 7/2016 | Kinoshita | G06F 3/0482 |
| 2017/0006686 A1* | 1/2017 | Vamberszky | G06K 9/4652 |
| 2017/0102843 A1* | 4/2017 | Manuja | G06T 11/001 |
| 2017/0150903 A1* | 6/2017 | Barnes | A61B 5/0062 |
| 2017/0285899 A1* | 10/2017 | Ishikawa | G06F 3/04845 |
| 2017/0365072 A1* | 12/2017 | Vadhri Venkata | G09G 5/02 |

OTHER PUBLICATIONS

Generating Color Palettes using Intuitive Parameters, Martijn Wijffelaars et al, 2008, The Eurographics Association and Blackwell Publishing Ltd., vol. 27, 743-750.

* cited by examiner

SYSTEM AND METHOD FOR DYNAMIC COLOR SCHEME APPLICATION

CROSS-REFERENCE TO RELATED APPLICATIONS

This application claims benefit of U.S. Provisional Patent Application No. 62/116,254, filed Feb. 13, 2015, the entirety of which is herein incorporated by reference.

BACKGROUND

Field

Embodiments of the present disclosure generally relate to the field of computer software. More specifically, embodiments provided herein relate to a system and method for generating and applying a dynamic color scheme to an image gallery on a graphical user interface.

Description of the Related Art

The production and availability of information and media has gained prevalence in today's society. The ability to instantly access and share information, experiences, news, photos, and videos over the internet has revolutionized the way people connect, learn, consume information, and participate in today's society.

In recent years, the popularity of personal web pages that are hosted by web service providers has increased. Examples of such personal web pages include profile pages on social network websites, personal blog web pages, personal online photo galleries, and the like. There exists a strong connection between a user and their personal web pages that has lead web page service providers to enable their customers to customize the look and feel of their personal web pages. For example, some web service providers allow web page users to upload photos that are displayed as background images on their personal web pages, and/or allow web page users to edit the font size and typeface displayed on their personal web pages. Some web service providers further enable web page users to modify the page colors as displayed on the web page and seen on a graphical user interface, such as font colors, border colors, and the like.

One popular approach of modifying the colors of user interface elements involves the user manually selecting one or more user interface elements, such as a hypertext markup language (HTML) button, and then selecting a color to be applied to the user interface element. However, a large number of user interface elements are typically included in even the simplest of personal web pages; therefore, the manual selection process quickly becomes cumbersome. Moreover, a majority of individuals do not understand the complex relationship between colors and what is aesthetically pleasing to the human eye, which results in web page users conducting a trial-and-error process that further contributes to the burdensome task of customizing a personal web page.

As the foregoing illustrates, there is a need for an improved technique for applying and displaying a dynamic color scheme to an image gallery on a graphical user interface, such as that displayed from a personal web page. More specifically, what is needed in the art is a dynamic color scheme application.

SUMMARY

The present disclosure generally relates to a software application platform which provides a user with the ability to customize, via the selection of a single color, the color for one or more user interface elements, such as the skin color, included on a graphical user interface. The selected color is enhanced by the application in real time based upon the average pixel hue of all image pixels displayed on the graphical user interface at any given time, and is further dynamically applied and displayed as a skin color surrounding the image pixels on the graphical user interface. A user selects a skin color via a color selection user interface. The hue of the selected color is adjusted in real time based upon the average pixel hue of all image pixels displayed on a the graphical user interface of an image gallery, such that the lightness, darkness, brightness, saturation, and intensity of the skin are adjusted and displayed based upon the images and their respective image pixels presented on the graphical user interface at any given time.

In one embodiment, a method for applying and displaying a dynamic color scheme to an image gallery on a graphical user interface is disclosed. The method includes (a) receiving a first selection of a first skin color, (b) determining an average pixel hue of all image pixels displayed on the graphical user interface of the image gallery, (c) assigning a first value to the average pixel hue, (d) applying the first value to the first selection of the first skin color in order to obtain a second skin color, (e) displaying the second skin color on the graphical user interface, and (f) repeating (b) through (e) as the pixels of different images within the image gallery are displayed on the graphical user interface.

In another embodiment, a computer system for applying and displaying a dynamic color scheme to an image gallery on a graphical user interface is disclosed. The computer system for applying and displaying a dynamic color scheme to an image gallery on a graphical user interface may include a processor and a memory storing instructions that, when executed by the processor, cause the computer system to (a) receive a first selection of a first skin color, (b) determine an average pixel hue of all image pixels displayed on the graphical user interface of the image gallery, (c) assign a first value to the average pixel hue, (d) apply the first value to the first selection of the first skin color in order to obtain a second skin color, (e) display the second skin color on the graphical user interface, and (f) repeat (b) though (e) as the pixels of different images within the image gallery are displayed on the graphical user interface.

In yet another embodiment, a non-transitory computer-readable medium, storing instructions that, when executed by a processor, cause a computer system to apply and display a dynamic color scheme to an image gallery on a graphical user interface is provided. The processor may perform the steps of (a) receiving a first selection of a first skin color, (b) determining an average pixel hue of all image pixels displayed on the graphical user interface of the image gallery, (c) assigning a first value to the average pixel hue, (d) applying the first value to the first selection of the first skin color in order to obtain a second skin color, (e) displaying the second skin color on the graphical user interface, and (f) repeating (b) though (e) as the pixels of different images within the image gallery are displayed on the graphical user interface.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein generally relate to dynamic color schemes and an application which receives a skin color selection, analyzes, determines, assigns, selects, generates, applies, and displays a second skin color on a graphical user interface in the skin area surrounding the image pixels. For example, a webpage may store various digital photographs in an image gallery such that the digital photographs can be accessed by a computing device upon request by a user or an application. The application may automatically analyze and determine the average pixel hue of all image pixels displayed on the graphical user interface connected to the computing device in order to apply and display a skin color that is appropriately adjusted in hue to be visually cohesive with the lightness, darkness, brightness, saturation, and intensity of the images displayed on the graphical user interface.

The term "user" as used herein includes, for example, a person or entity that owns a computing device or wireless device; a person or entity that operates or utilizes a computing device or a wireless device; or a person or entity that is otherwise associated with a computing device or a wireless device. It is contemplated that the term "user" is not intended to be limiting and may include various examples beyond those described.

The term "image" as used herein includes, for example, messages, photos, videos, blogs, advertisements, notifications, and various other types of media which may be visually consumed by a user. It is contemplated that the term "image" is not intended to be limiting and may include various examples beyond those described.

The term "skin" as used herein includes, for example, a custom graphical appearance package achieved by the use of a graphical user interface that can be applied to computer software, operating systems, websites, and the like in order to suit the purpose, topic, or tastes of different users without affecting the functionality of the interface. The term "skin" may include the area surrounding an image or text as displayed on a webpage and as viewed on a graphical user interface. The skin may be applied to the background area of a webpage in order to enhance the information displayed on the webpage. It is contemplated that the term "skin" is not intended to be limiting and may include various examples beyond those described.

Figure 1:
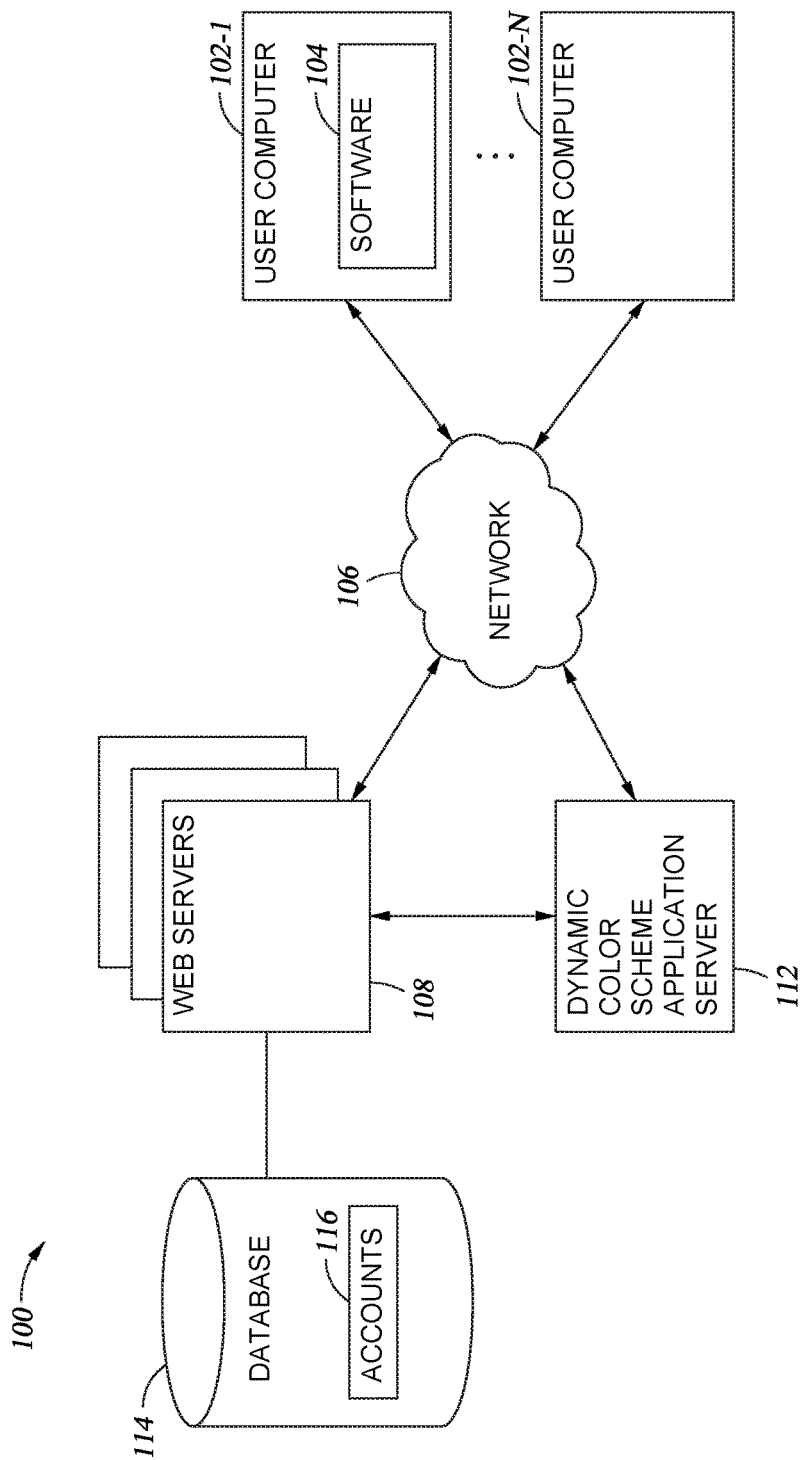
FIG. 1 illustrates a computer system configured for providing a website having a dynamic color scheme application according to one embodiment described herein.

FIG. 1 illustrates a computing system 100 configured for providing a dynamic color scheme application in which embodiments of the disclosure may be practiced. As shown, the computing system 100 may include a plurality of web servers 108, a dynamic color scheme application server 112, and a plurality of user computers (i.e., mobile/wireless devices) 102 (only two of which are shown for clarity), each connected to a communications network 106 (for example, the Internet). The web servers 108 may communicate with the database 114 via a local connection (for example, a Storage Area Network (SAN) or Network Attached Storage (NAS)) or over the Internet (for example, a cloud based storage service). The web servers 108 are configured to either directly access data included in the database 114 or to interface with a database manager that is configured to manage data included within the database 114. An account 116 is a data object that stores data associated with a user, such as the user's email address, password, contact information, billing information, color scheme(s) for his or her personal web page(s), and the like.

Each user computer 102 may include conventional components of a computing device, for example, a processor, system memory, a hard disk drive, a battery, input devices such as a mouse and a keyboard, and/or output devices such as a monitor or graphical user interface, and/or a combination input/output device such as a touchscreen which not only receives input but also displays output. Each web server 108 and the dynamic color scheme application server 112 may include a processor and a system memory (not shown), and may be configured to manage content stored in database 114 using, for example, relational database software and/or a file system. The web servers 108 may be programmed to communicate with one another, user computers 102, and the dynamic color scheme application server using a network protocol such as, for example, the TCP/IP protocol. The dynamic color scheme application server 112 may communicate directly with the user computers 102 through the communications network 106. The user computers 102 are programmed to execute software 104, such as web browser programs and other software applications, and access web pages and/or applications managed by web servers 108 by specifying a uniform resource locator (URL) that directs to web servers 108.

In the embodiments described below, users are respectively operating the user computers 102 that are connected to the web servers 108 over the communications network 106. Web pages are displayed to a user via the user computers 102. The web pages are transmitted from the web servers 108 to the user's computer 102 and processed by the web browser program stored in that user's computer 102 for display through a display device and/or a graphical user interface in communication with the user's computer 102.

In one example, images displayed on the user's computer 102 may be a digital photograph accessed via an online photo gallery. The user's computer 102 may access the online photo gallery via the communications network 106 which, in turn, retrieves the online photo gallery from the web servers 108 connected to the database 114 and causes the images to be displayed through a graphical user interface of the user's computer 102. The online photo gallery may be managed with a username and password combination, or other similar restricted access/verification required access methods, which allow the user to "log in" and access the images.

It is noted that the user computer 102 may be a personal computer, laptop mobile computing device, smart phone, video game console, home digital media player, network-connected television, set top box, and/or other computing devices having components suitable for communicating with the communications network 106. The user computer 102 may also execute other software applications configured to receive image content and color scheme information from the dynamic color scheme application, such as, but not limited to, image display software, media players, computer and video games, and/or widget platforms, among others.

Figure 2:
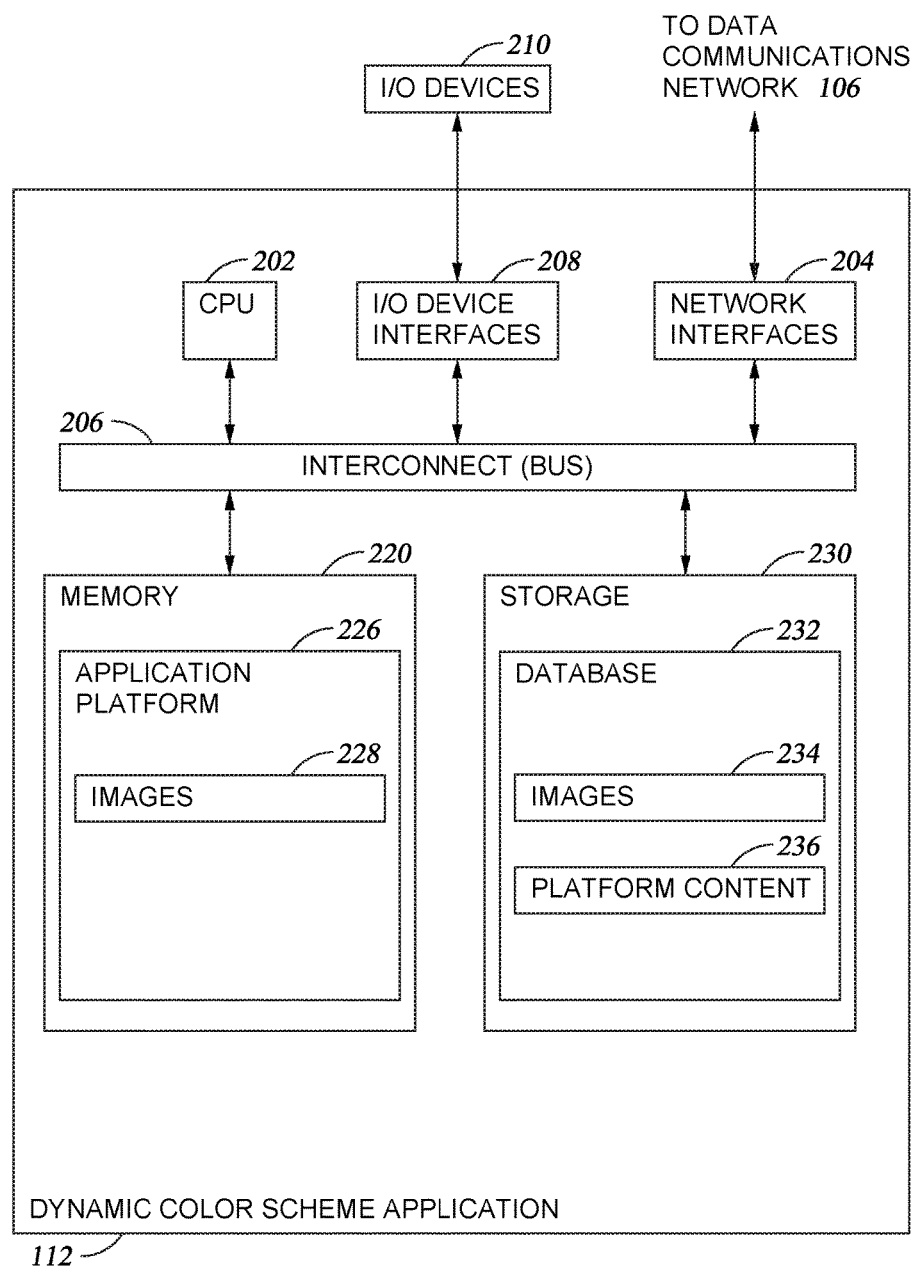
FIG. 2 illustrates a more detailed view of a server of FIG. 1 according to one embodiment described herein.

FIG. 2 illustrates a more detailed view of the dynamic color scheme application server 112 of FIG. 1. The dynamic color scheme application server 112 includes, without limitation, a central processing unit (CPU) 202, a network interface 204, memory 220, and storage 230 communicating via an interconnect 206. The dynamic color scheme application server 112 may also include I/O device interfaces 208 connecting I/O devices 210 (for example, keyboard, video, mouse, audio, touchscreen, etc.). The dynamic color scheme application 112 may further include the network interface 204 configured to transmit data via the communications network 106.

The CPU 202 retrieves and executes programming instructions stored in the memory 220 and generally controls and coordinates operations of other system components. Similarly, the CPU 202 stores and retrieves application data residing in the memory 220. The CPU 202 is included to be representative of a single CPU, multiple CPU's, a single CPU having multiple processing cores, and the like. The interconnect 206 is used to transmit programming instructions and application data between the CPU 202, I/O device interfaces 208, storage 230, network interfaces 204, and memory 220.

The memory 220 is generally included to be representative of a random access memory and, in operation, stores software applications and data for use by the CPU 202. Although shown as a single unit, the storage 230 may be a combination of fixed and/or removable storage devices, such as fixed disk drives, floppy disk drives, hard disk drives, flash memory storage drives, tape drives, removable memory cards, CD-ROM, DVD-ROM, Blu-Ray, HD-DVD, optical storage, network attached storage (NAS), cloud storage, or a storage area-network (SAN) configured to store non-volatile data.

The memory 220 may store instructions and logic for executing an application platform 226 which may include images 228. The storage 230 may store images 234 and other user generated media and may include a database 232 configured to store images 234 associated with application platform content 236. The database 232 may also store application content relating to data associated with user generated media or images and other application features for providing the user with an application platform that displays images 234. The database 232 may be any type of storage device.

Network computers are another type of computer system that can be used in conjunction with the disclosures provided herein. Network computers do not usually include a hard disk or other mass storage, and the executable programs are loaded from a network connection into the memory 220 for execution by the CPU 202. A web TV system is also considered to be a computer system, but it may lack some of the features shown in FIG. 2, such as certain input or output devices. A typical computer system will usually include at least a processor, memory, and an interconnect coupling the memory to the processor.

Figure 3:
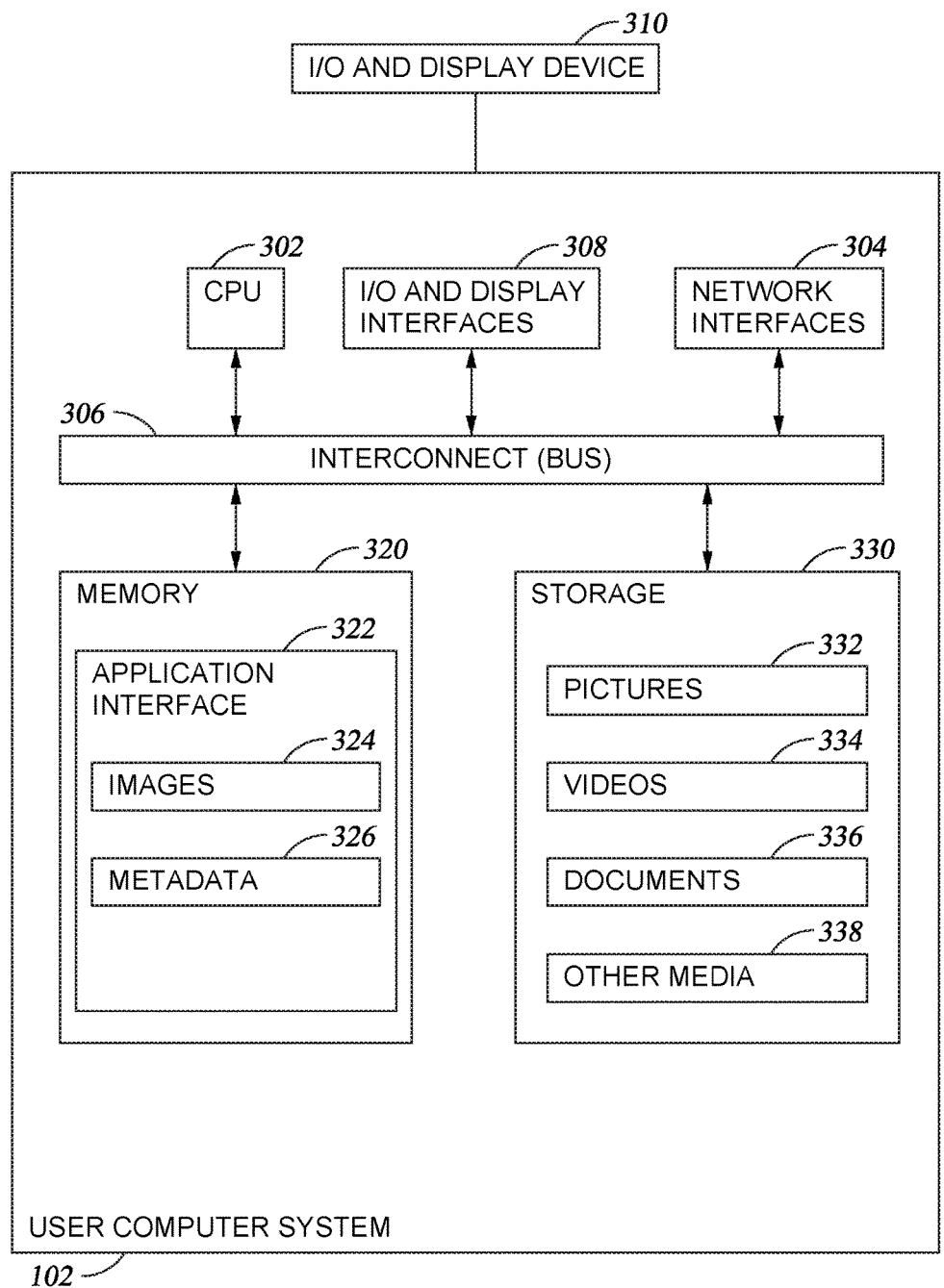
FIG. 3 illustrates a user computing system used to access a website and utilize the dynamic color scheme application according to one embodiment described herein.

FIG. 3 illustrates a user computer 102 used to access the dynamic color scheme application 112 and display images associated with the application platform 226. The user computer 102 may include, without limitation, a central processing unit (CPU) 302, a network interface 304, an interconnect 306, a memory 320, and storage 330. The user computer 102 may also include an I/O device interface 308 connecting I/O devices 310 (for example, keyboard, display, touchscreen, and mouse devices) to the user computer 102.

Like CPU 202, CPU 302 is included to be representative of a single CPU, multiple CPU's, a single CPU having multiple processing cores, etc., and the memory 320 is generally included to be representative of a random access memory. The interconnect 306 may be used to transmit programming instructions and application data between the CPU 302, I/O device interfaces 308, storage 330, network interface 304, and memory 320. The network interface 304 may be configured to transmit data via the communications network 106, for example, to stream content from the dynamic color scheme application server 112. Storage 330, such as a hard disk drive or solid-state storage drive (SSD), may store non-volatile data. The storage 330 may contain pictures 332, videos 334, documents 336, and other media 338. Illustratively, the memory 320 may include an application interface 322, which itself may display images 324, and/or store metadata 326 of images 324. The application interface 322 may provide one or more software applications which allow the user to access media items and other content hosted by the dynamic color scheme application server 112.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present example also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system interconnect.

The algorithms and displays presented herein are not inherently related to any particular computer or other apparatus. Various general purpose systems may be used with programs in accordance with the teachings herein, or it may prove convenient to construct a more specialized apparatus to perform the required method operations. The required structure for a variety of these systems will appear from the description above. In addition, the present examples are not described with reference to any particular programming language, and various examples may thus be implemented using a variety of programming languages.

As described in greater detail herein, embodiments of the disclosure provide a software application through which a user may customize, via a selection of a single color, the color of one or more user interface elements, such as a web page skin, displayed in a graphical user interface from which the software application may apply and display a dynamic color scheme to the selected webpage skin color based upon an analysis of the image pixels within the viewable area of a graphical user interface. In particular, a color selection user interface is presented to the user, for example, a color wheel or color selector, from which the user selects a single skin color. Once the single skin color is selected, a real time determination of the average pixel hue of all image pixels displayed on the graphical user interface is made. A first value is assigned to the average pixel hue and subsequently applied to the first user selected skin color from which a second skin color, based on the first skin color, is obtained. The second skin color is displayed as the skin of the image gallery on the graphical user interface. The second skin color as displayed is an enhancement of the lightness, darkness, brightness, saturation, and intensity of the first selection of the first skin color. The second skin color is adjusted based on the image pixels of the images presented on the graphical user interface such that the images presented on the graphical user interface live vibrantly and are optimized on the graphical user interface to be aesthetically pleasing to a viewer's eye.

FIGS. 4-5 and FIGS. 6-7, respectively, are conceptual diagrams illustrating application of a dynamic color scheme to a user interface 400, 600 according to embodiments described herein. The user interface 400, 600 illustrated in FIGS. 4-5 and FIGS. 6-7 are accessible via a web browser application (not illustrated) and include a plurality of web-based user interface elements, for example, a header, a footer, a body, borders, links, text blocks, and the like, which are arranged to present a digital photo gallery web page within the web browser application. For example, user interface 400, 600 may include a main window 402, 602 that is configured to display the images contained within the photo gallery. For example, the user interface 400, 600 can be displayed to a user who is viewing a friend's photos via the photo gallery web page, or to a client who is viewing a professional photographer's photo gallery web page.

Figure 4:
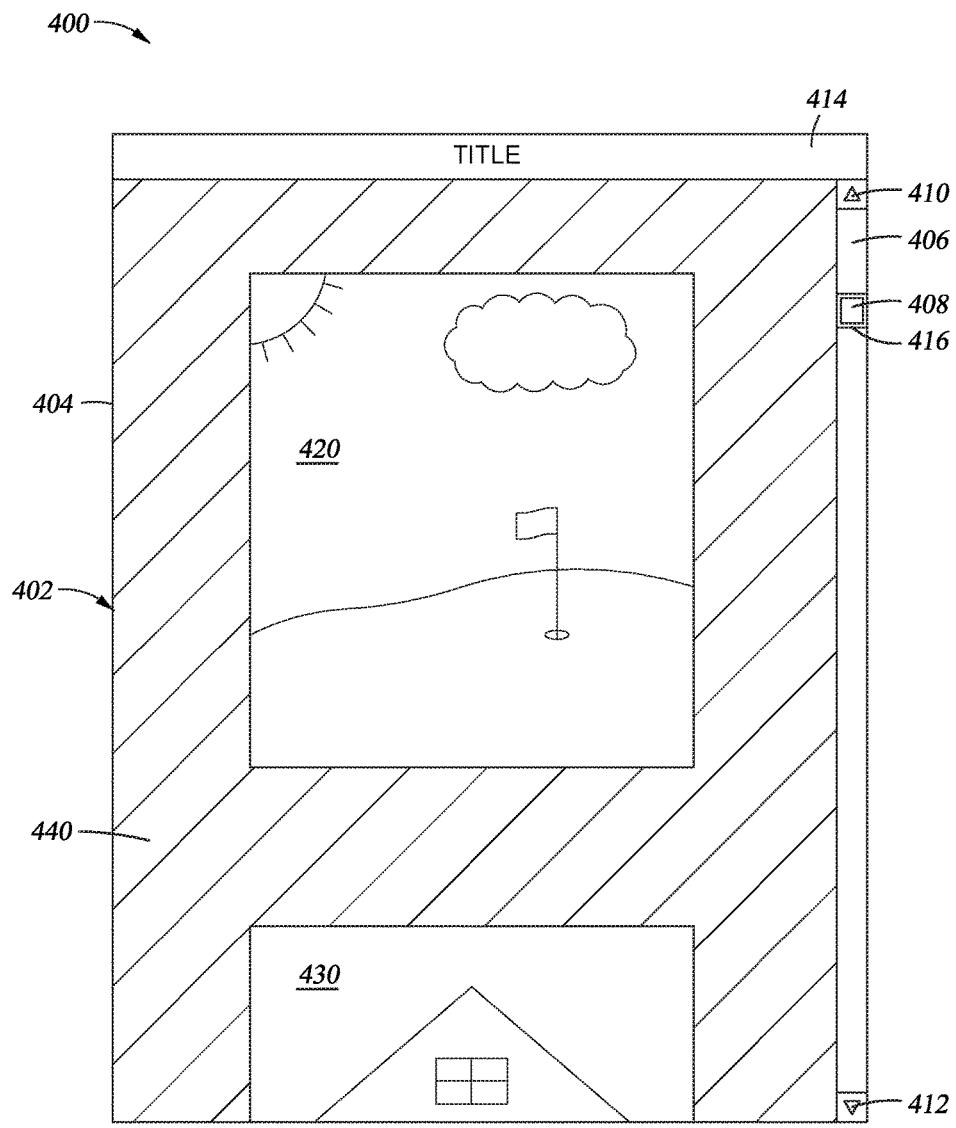
FIG. 4 illustrates a first conceptual diagram of applying a color scheme to a user interface at a first location, according to embodiments described herein.

In the embodiment illustrated in FIG. 4, the user interface 400 displays a first view of a photo gallery web page 404 within the main window 402. The user interface 400 of the photo gallery web page 404 may be owned by an administrator user (e.g., a professional photographer) and viewed by a user (e.g., a client of the professional photographer). The main window 402 may contain a window scroll bar 406, a scroll location indicator 408 located at a first scroll position 416, an up arrow 410, a down arrow 412, and a title bar 414. The photo gallery web page 404 as illustrated in FIG. 4 is configured to display a column of images, with each row of the column containing one image. As shown, a first image 420 is fully visible to a user of the photo gallery web page 404, while a second image 430 is partially visible to a user of the photo gallery web page 404. In fact, as displayed only a top portion of the second image 430 is visible to a user of the of the photo gallery web page 404. The area within the main window 402 surrounding image 420 and image 430 is the skin 440.

As described above, a user can select a color for the skin 440. For example, the user can select the color for the skin 440 by typing in a color number (e.g., hexadecimal color value), selecting the color from a color palette or color wheel, or via any other suitable color selection technique. In one embodiment, the first selection of a first skin color is made by the administrator user of the photo gallery web page which has identified the first skin color chosen as being aesthetically pleasing based on the images contained within the photo gallery web page.

After the web server 108 receives a first selection of a first skin color (not shown) and before displaying the skin color on the photo gallery web page 404, the dynamic color scheme application determines the average pixel hue of all image pixels displayed on the graphical user interface of the photo gallery web page 404. As illustrated in FIG. 4, all pixels of image 420 would be identified and analyzed to calculate a hue average as image 420 is fully displayed within the main window 402 of the photo gallery web page 404. In other words, every pixel of image 420 is displayed in the main window 402. Consequently, each pixel of the image 420 will be analyzed by the dynamic color scheme application. Furthermore, only those pixels of image 430 which are viewable in the main window 402 at the exact time the determination is made are identified and analyzed as part of the hue average determination. Each individual pixel displayed in the main window 402 is individually analyzed and assigned a value based on the analysis of the individual pixel's hue. After each individual pixel hue displayed has been individually analyzed and assigned a value an average of the individual pixel hues considered is calculated and the average hue is further assigned a first value. The first value is applied to the first selection of the first skin color such as to adjust the lightness, darkness, brightness, saturation, and intensity of the first skin color, thus creating a second skin color. As such, the second skin color is displayed in FIG. 4 as a skin 440 of the photo gallery web page 404. The second skin color allows for the images displayed within the main window 402 to appear in an aesthetically pleasing manner in relation to the first skin color selected by the administrator user of the photo gallery web page 404.

Figure 5:
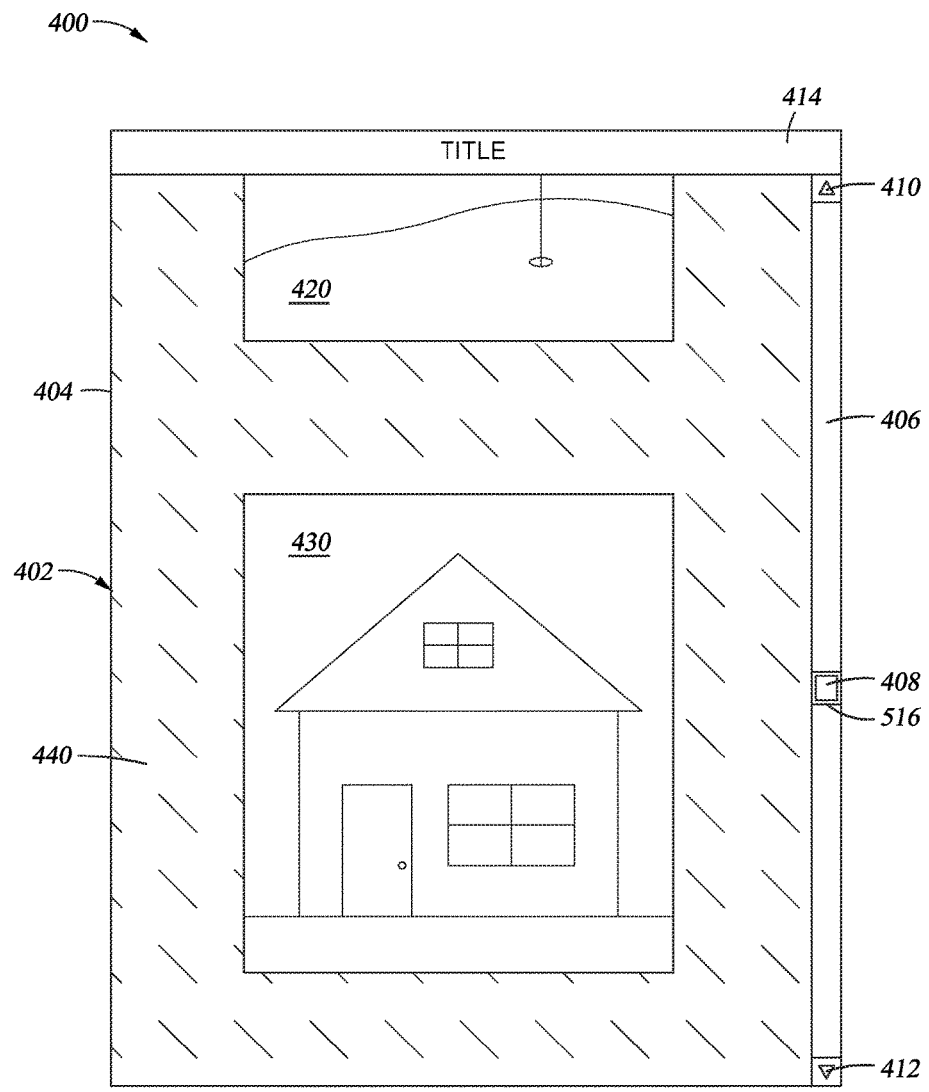
FIG. 5 illustrates the first conceptual diagram of applying a color scheme to a user interface of FIG. 4 at a second location, according to embodiments described herein.

FIG. 5 illustrates a second displayed view of the photo gallery web page of FIG. 4. In FIG. 5, the same image gallery of FIG. 4 is displayed, however only a partial view of the first image 420 is now visible while a full view of the second image 430 is now visible, due to a change in position of the scroll location indicator 408 from a first scroll position 416 of FIG. 4 to a second scroll position 516 of FIG. 5 within the main window 402. As such, the average pixel hue of all image pixels may be recalculated because the image pixels contained within the main window 402 and displayed on a graphical user interface have changed. As such, only the image pixels of image 420, as shown in FIG. 5, that are contained and displayed within the main window 402 are identified and analyzed to calculate the hue average because image 420 is not fully displayed within the main window 402 of the photo gallery web page 404. Furthermore, all image pixels of image 430, as shown in FIG. 5, are identified and analyzed to calculate the hue average because image 430 of FIG. 5 is fully displayed within the main window 402 of the photo gallery web page 404.

Each individual pixel displayed from images 420 and 430 are individually analyzed and assigned a value based on the hue value of each individual pixel. After each individual pixel hue displayed is individually analyzed and assigned a value, an average of the individual pixel hues analyzed is calculated and the average hue is further assigned a first value. The first value is applied to the first selection of the first skin color such as to adjust the lightness, darkness, brightness, saturation, and intensity of the first skin color and thus create a second skin color. As such, the second skin color is displayed in FIG. 5 as skin 440 of the photo gallery web page 404. The second skin color allows for the images displayed within the main window 402 to be aesthetically pleasing based on the first skin color selected by the administrator user of the photo gallery web page 404. It should be noted, however, that the second skin color 440 as displayed in FIG. 4 differs from the second skin color 440 as displayed in FIG. 5. The hue of the skin 440 of FIGS. 4 and 5 differ due to the image pixels available for analysis in determining the average pixel hue of all image pixels displayed on the graphical user interface when the scroll location indicator 408 of FIG. 4 at the first scroll position 416 as compared to the scroll location indicator 408 of FIG. 5 at the second scroll position 516.

As illustrated in FIG. 5, each time the image pixels of different images within the photo gallery web page 404 as displayed on a graphical user interface change location, the analysis which determines the average pixel hue of all image pixels displayed on the graphical user interface of the photo gallery web page 404 may be recalculated. If recalculated, subsequently the average pixel hue may be reassigned a first value, the first value may be reapplied to the first selection of the first skin color in order to obtain a second skin color, and the second skin color may then be displayed on the skin 440 on the graphical user interface. Any time image pixels are added to or subtracted from view in the main window 402, the dynamic color scheme application performs the above analysis to dynamically change the skin color.

In one example, an administrator user may upload two digital photographs to a photo gallery web page equipped with the dynamic color scheme application, wherein each digital photograph comprises eight megapixels. The administrator user may include the two photos in a single online photo gallery in which the online photo gallery only contains the two eight-megapixel digital photographs. At any time, the administrator user may select a first skin color for the online photo gallery by making a color selection. The color selection option may be in the form of a color palette generation interface that is displayed in a separate pop-up window from which the administrator user selects a single color from the options available in the color palette (not shown). In another embodiment, the administrator user may select a pre-defined color from a grid of colors in a color picker (not shown). In another embodiment, a color picker may enable the administrator user to select the color from a color gradient (not shown). In another embodiment alternative color pickers or input interfaces for selecting a color may be presented to the administrator user from which the administrator user can select the color (not shown).

After receiving the first selection of the first skin color (e.g., blue), an average of the pixel hue of all image pixels displayed on the graphical user interface of the image gallery is determined. In the example, the skin color displayed on the skin of the photo gallery web page is dependent upon the image pixels present on a user's graphical user interface. In a first case, if 100 percent of the first digital photograph is viewable on the graphical user interface, then 100 percent of the image pixels of the first digital photograph (e.g., all eight million pixels of the first image) will be taken into account in the dynamic color scheme application calculations. Furthermore, if none of the second digital photograph is viewable on the graphical user interface, then zero percent of the image pixels of the first digital photograph will be taken into account in the dynamic color scheme application calculations. In the first case, the average pixel hue of the eight million pixels of the first digital photograph is determined, and because none of the pixels of the second digital photograph are viewable on the graphical user interface, none of the pixels of the second digital photograph are considered. After determining the average pixel hue, a first value is assigned to the average pixel hue. The first value is subsequently applied to the first selection of the first skin color (e.g., blue) as selected by the administrator user in order to obtain a second skin color (e.g., a first hue of blue—"blue 1") which may enhance display characteristics of the digital photographs viewable on the graphical user interface. The second skin color is then displayed on the graphical user interface as the skin color (e.g., a first hue of blue—"blue 1").

However, as a user of the photo gallery web page scrolls through the photo gallery webpage the image pixels viewable on the graphical user interface may change. In order to compensate for the addition or subtraction of the image pixels viewable on the graphical user interface, the dynamic color scheme application repeats as often as necessary as the pixels of different images within the image gallery are displayed on the graphical user interface. As a second example, a user may scroll to a second location of the photo gallery web page. At such a second location, the lower 30 percent of the first digital photograph and upper 70 percent of the second digital photograph may be viewable on the graphical user interface. As such, the lower 2,400,000 pixels (30 percent of eight million pixels) viewable of the first digital photograph and the upper 5,600,000 pixels viewable (70 percent of eight million pixels) of the second digital photograph will be included in the average pixel hue calculation of all image pixels displayed on the graphical user interface. A first value is assigned to the average pixel hue, and the first value is applied to the first selection of the first skin color as selected by the administrator user (e.g., blue) in order to obtain a second skin color (e.g., a second hue of blue—"blue 2"). The second skin color (e.g., the second hue of blue—"blue 2") is visible while the lower 30 percent of the first digital photograph and the upper 70 percent of the second digital photograph are viewable on the graphical user interface. The second skin color (e.g., the second hue of blue—"blue 2") may be different than the second skin color (e.g., the first hue of blue—"blue 1") visible while 100 percent of the first digital photograph and zero percent of the second the second digital photograph are viewable on the graphical user interface.

However, as a user of the photo gallery web page scrolls through the photo gallery webpage the image pixels viewable on the graphical user interface may continue to change. In order to compensate for the addition or subtraction of the image pixels viewable on the graphical user interface, the dynamic color scheme application repeats as often as necessary as the pixels of different images within the image gallery are displayed on the graphical user interface. As a third example, a user may scroll to a third location of the photo gallery web page. At such a third location none of the first digital photograph may be visible and 100 percent of the second digital photograph may be viewable on the graphical user interface. As such, none of the pixels of the first digital photograph and 100 percent of the pixels (8,000,000 pixels) of the second digital photograph will be included in the average pixel hue calculation of all image pixels displayed on the graphical user interface. A first value is assigned to the average pixel hue, and the first value is applied to the first selection of the first skin color as selected by the administrator user (e.g., blue) in order to obtain a second skin color (e.g., a third hue of blue—"blue 3"). The second skin color (e.g., the third hue of blue—"blue 3") is visible while zero percent of the first digital photograph and 100 percent of the second digital photograph are viewable on the graphical user interface. The second skin color (e.g., the third hue of blue—"blue 3") may be different than both the second skin colors in the previous examples (e.g., the first hue of blue—"blue 1"; and the second hue of blue—"blue 2") which were visible while 100 percent of the first digital photograph and zero percent of the second digital photograph were viewable on the graphical user interface as in the first example, or 30 percent of the first digital photograph and 70 percent of the second the second digital photograph are viewable on the graphical user interface as in the second example.

Figure 6:
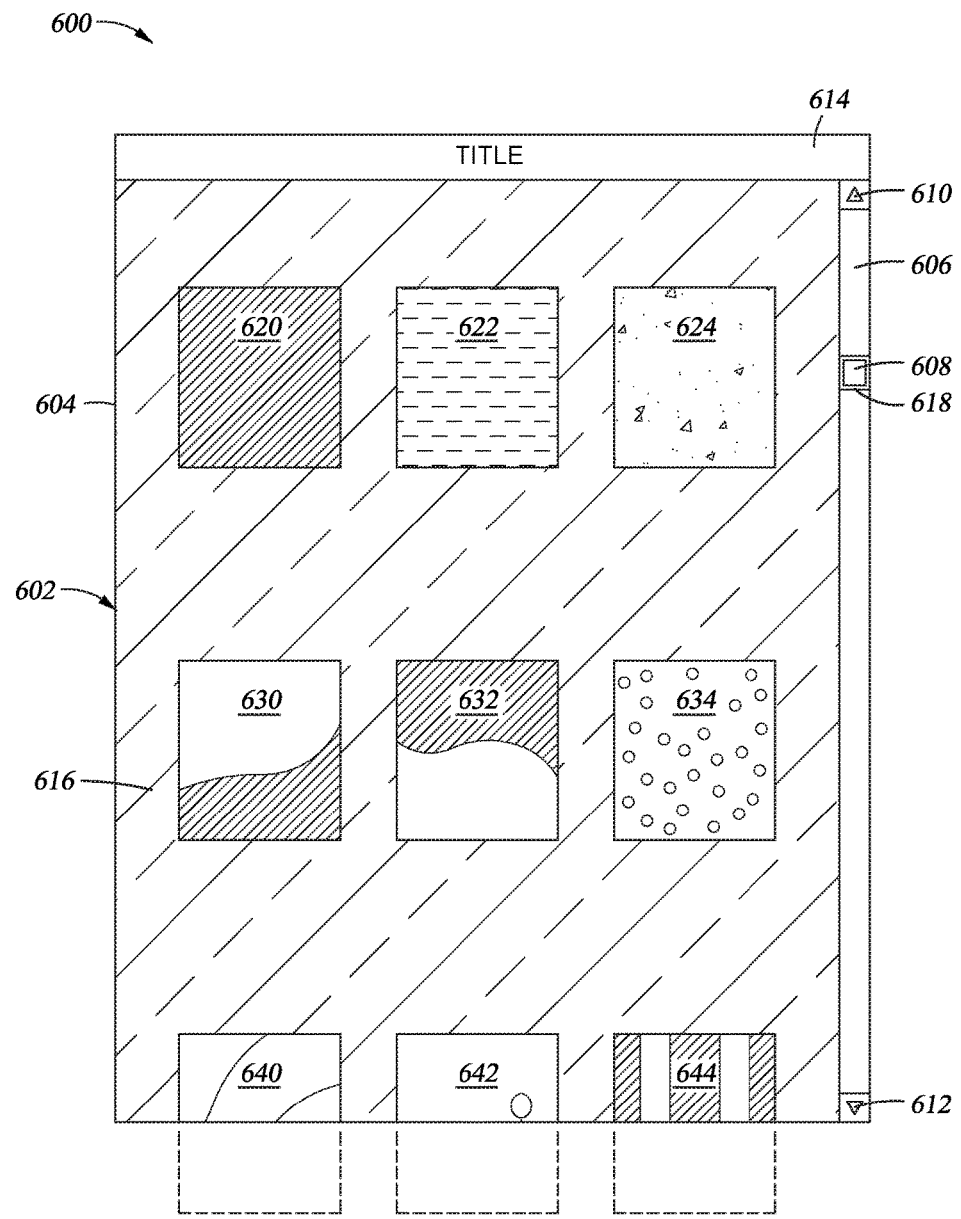
FIG. 6 illustrates a second conceptual diagram of applying a color scheme to a user interface at a first location, according to embodiments described herein.

FIG. 6 illustrates another embodiment of a user interface 600 of a photo gallery web page containing nine digital photographs, owned by an administrator user (e.g., a professional photographer) as viewed by a user (e.g., a client of the professional photographer). User interface 600 may include a main window 602 that is configured to display the images contained within the photo gallery.

In the particular example illustrated in FIG. 6, the user interface 600 displays a first view of a photo gallery web page 604 within the main window 602. The main window 602 may contain a window scroll bar 606, a scroll location indicator 608 located at a first scroll position 618, an up arrow 610, a down arrow 612, and a title bar 614. The photo gallery web page 604 as illustrated is configured to display rows of images, with each row containing three images. Overall, there are three rows of images in FIG. 6. As shown, a first row of images, containing images 620, 622, and 624, and a second row of images, containing images 630, 632, and 634, are fully visible to a user of the photo gallery web page 604 on a graphical user interface. However, a third row of images, containing images 640, 642, and 644, are only partially visible to a user of the photo gallery web page 404. In fact, as displayed, only the top 40 percent of the images 640, 642, and 644 are visible to a user of the of the photo gallery web page 604. The lower 60 percent of the image 640, 642, and 644 are shown in phantom in FIG. 6 as the main window 602 is located at a first scroll position 618. The area within the main window 602 surrounding images 620, 622, 624, 630, 632, 634, 640, 642, and 644 is the skin 616.

As described, the dynamic color scheme application receives a first selection of a first skin color (e.g., green) from the administrator user (e.g., the professional photographer). The first selection of a first skin color (e.g., green) is made by the administrator user of the photo gallery web page who has identified the first skin color chosen as being aesthetically pleasing based on the images contained within the photo gallery web page. Accordingly, embodiments of the disclosure include a real-time dynamic color scheme adjustment to the first skin color chosen for the photo gallery web page 604.

After receiving the first selection of the first skin color (e.g., green), an average of the pixel hue of all image pixels displayed on the graphical user interface of FIG. 6 of the image gallery is determined. In FIG. 6, the skin color displayed on the skin 616 of the main window 602 of the photo gallery web page 604 is dependent upon the image pixels present on a user's graphical user interface. In FIG. 6, 100 percent of images 620, 622, 624, 630, 632, and 634 are viewable in the main window 602 of the photo gallery web page 604 on the user's graphical user interface, and as such 100 percent of the image pixels of images 620, 622, 624, 630, 632, and 634 (e.g. all pixels of images 620, 622, 624, 630, 632, and 634) will be analyzed in the dynamic color scheme application calculations. Furthermore, because the upper 40 percent each of images 640, 642, and 644 are viewable in the main window 602 of the photo gallery web page 604 on the user's graphical user interface, the upper 40 percent of the pixels of image 640, the upper 40 percent of the pixels of image 642, and the upper 40 percent of the pixels of image 644 will also be analyzed in the dynamic color scheme application calculations. The average pixel hue of all pixels of images 620, 622, 624, 630, 632, and 634, and the upper 40 percent of each of the pixels of images 640, 642, and 644 are determined and averaged into an average pixel hue of all image pixels displayed on the graphical user interface. After finding the average pixel hue, a first value is assigned to the average pixel hue. The first value is subsequently applied to the first selection of the first skin color (e.g., green) as selected by the administrator user in order to obtain a second skin color (e.g., a first hue of green—"green 1") optimized to enhance the digital photographs viewable on the graphical user interface. The second skin color is then displayed on the graphical user interface as the skin color (e.g., a first hue of green—"green 1").

However, as the user (e.g., a client) of the photo gallery web page scrolls through the photo gallery webpage from the first scroll location to a second scroll location, the image pixels viewable on the graphical user interface may change. In order to compensate for the addition or subtraction of the image pixels viewable on the graphical user interface the dynamic color scheme application repeats as the pixels of different images within the image gallery are displayed on the graphical user interface.

Figure 7:
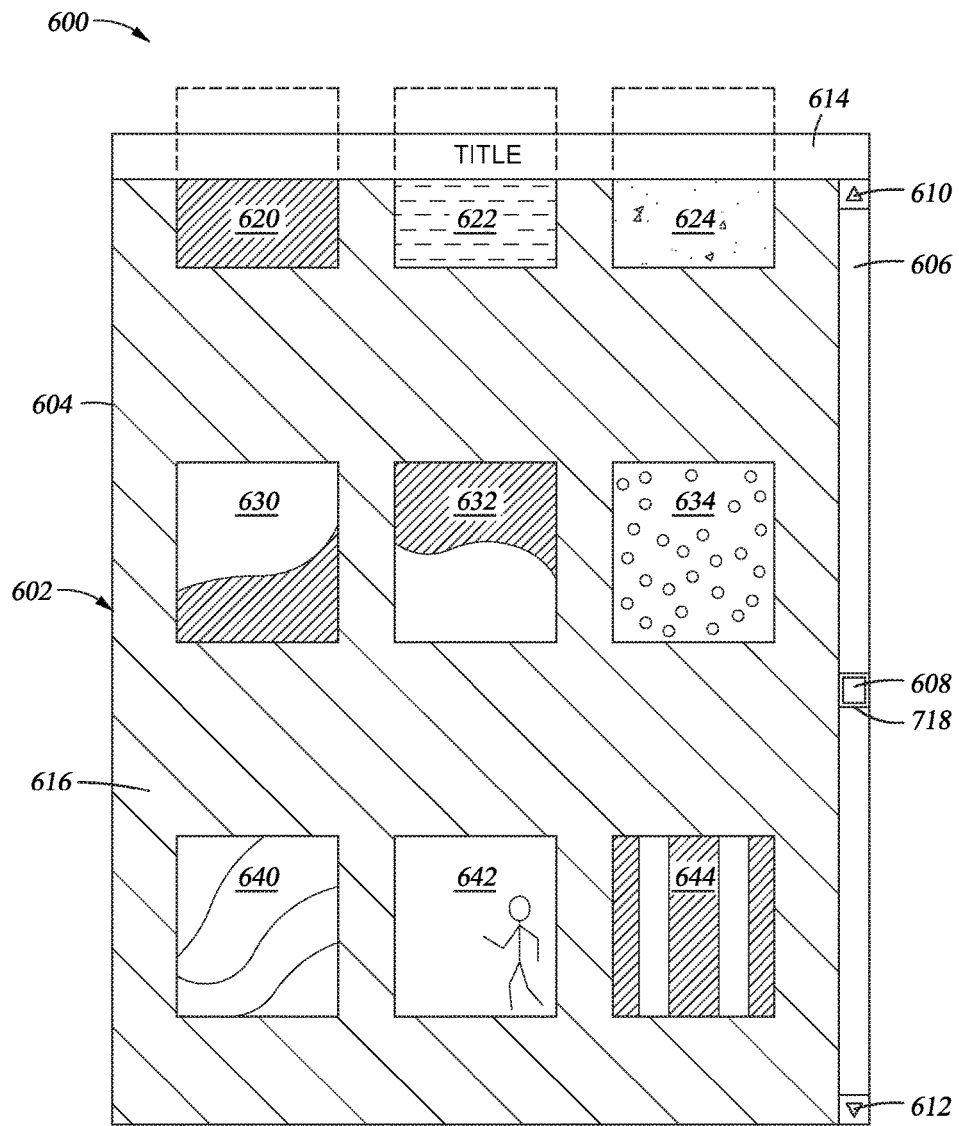
FIG. 7 illustrates the second conceptual diagram of applying a color scheme to a user interface of FIG. 6 at a second location, according to embodiments described herein.

As illustrated in FIG. 7, a user may scroll from the first scroll position 618 of FIG. 6 to a second scroll position 718 of the photo gallery web page, as illustrated in FIG. 7. FIG. 7 illustrates the embodiment of FIG. 6 at a second scroll position 718, and includes a user interface 600 of a photo gallery web page containing nine digital photographs, owned by an administrator user (e.g., a professional photographer) as viewed by a user (e.g., a client of the professional photographer). User interface 600 may include a main window 602 that is configured to display the images contained within the photo gallery.

In the particular example illustrated in FIG. 7, the user interface 600 displays a second view of a photo gallery web page 604 within the main window 602. The main window 602 may contain a window scroll bar 606, a scroll location indicator 608 located at a second scroll position 718, an up arrow 610, a down arrow 612, and a title bar 614. The photo gallery web page 604 as illustrated is configured to display rows of images, with each row containing three images. Overall, there are three rows of images in FIG. 7. As shown, a first row of images, containing images 620, 622, and 624, are only partially visible to a user of the photo gallery web page 604. In fact, as displayed only the lower 15 percent of the images 620, 622, and 624 are visible to a user of the photo gallery web page 604. The upper 85 percent of the images 620, 622, and 624 are shown in phantom in FIG. 7 as the main window 602 is located at a second scroll position 718, and a full and complete view of images 620, 622, and 624 is not permitted. However, a second row of images and a third row of images, containing images 630, 632, 634, 640, 642, and 644, are fully visible to a user of the photo gallery web page 604. The area within the main window 602 surrounding images 620, 622, 624, 630, 632, 634, 640, 642, and 644 is the skin 616.

At such a second scroll position 718 of FIG. 7, only the lower 15 percent of the images 620, 622, and 624 are viewable on the graphical user interface. As such, if each of the images 620, 622, 624, 630, 632, 634, 640, 642, and 644 of FIG. 7 contain five million pixels, then only the lower 750,000 pixels (15 percent of five million pixels) viewable of each of the images 620, 622, and 624 of the first row of FIG. 7 along with all five million pixels of each images 630, 632, 634, 640, 642, and 644 will be analyzed in the average pixel hue calculation of all image pixels displayed on the graphical user interface of FIG. 7. As such, an average pixel hue may be determined by taking the average of the 32,250,000 pixels (15 percent of five million pixels for image 620 added to 15 percent of five million pixels for image 622 added to 15 percent of five million pixels for image 624 added to 100 percent of five million pixels for image 630 added to 100 percent of five million pixels for image 632 added to 100 percent of five million pixels for image 634 added to 100 percent of five million pixels for image 640 added to 100 percent of five million pixels for image 642 added to 100 percent of five million pixels for image 644) included in the viewable area of the main window 702 of the graphical user interface.

A first value is assigned to the average pixel hue, and the first value is applied to the first selection of the first skin color as selected by the administrator user (e.g., green) in order to obtain a second skin color (e.g., a second hue of green—"green 2"). The second skin color (e.g., the second hue of green—"green 2") may be visible while at the second scroll position 718 on the graphical user interface. The second skin color (e.g., the second hue of green—"green 2") may also be different than the second skin color (e.g., the first hue of green—"green 1") which was visible while at the first scroll position 618 on the graphical user interface of FIG. 6.

However, as a user of the photo gallery web page continues to scroll through the photo gallery webpage the image pixels viewable on the graphical user interface may continue to change. In order to compensate for the addition or subtraction of the image pixels viewable on the graphical user interface the dynamic color scheme application repeats and continues to update the first selection of the first skin color selected by the administrator user as the pixels of different images within the image gallery are displayed on the graphical user interface.

In another embodiment, it is contemplated that the dynamic color scheme application may account for the average pixel hue of all images contained within the gallery of the photo gallery web page, such that the average of all image pixels of all images contained within the gallery are considered when determining the average pixel hue. In this embodiment rather than utilizing those image pixels displayed and visible to a user on a graphical user interface all image pixels of all images contained within the same image gallery are used to determine an average pixel hue. After determining the average pixel hue a first value is assigned to the average pixel hue. The first value is applied to the first selection of the first skin color, as selected by the administrator user, in order to obtain a second skin color. The second skin color is displayed on the graphical user interfere. As such, in this embodiment, as a user scrolls from a first scroll location within the main window to a second scroll location within the main window the second skin color will remain static as all image pixels have been used to calculate the average pixel hue and determine the first value. Furthermore, the dynamic color scheme application may update and repeat the steps of determining an average pixel hue of all image pixels of all images contained within a gallery of the online photo web page, assigning a first value to the average pixel hue, applying the first value to the first selection of the first skin color in order to obtain a second skin color, and displaying the second skin color on the graphical user interface if images are added to or subtracted from the gallery of the online photo web page.

Figure 8:
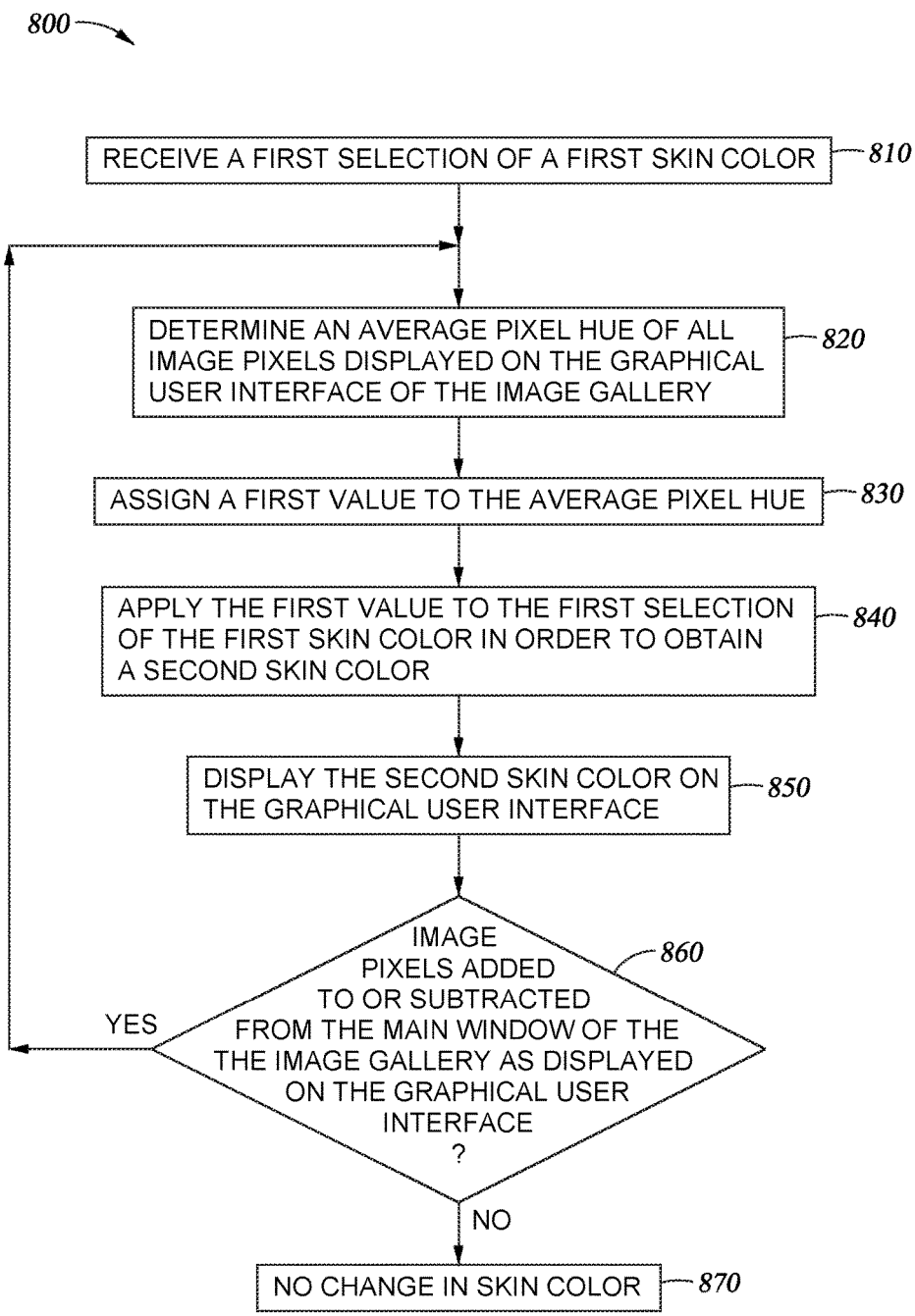
FIG. 8 schematically illustrates operations of a method for dynamically applying a color scheme operation according to one embodiment described herein.

FIG. 8 schematically illustrates operations of a method 800 for dynamically adjusting the color of a skin 440 of an image gallery according to one embodiment described herein. The method generally relates to embodiments where images comprising individual pixels are displayed within a photo gallery web page 404 as construed in a main window 402 and displayed to a user on a graphical user interface, and based upon an analysis of the image pixels displayed within the main window 402 a skin color may be set to enhance the image pixels as displayed to a user via a graphical user interface. At operation 810, a first selection of a first skin color is received. The color selection is made by an administrator user, generally the owner of the photo gallery web page (e.g., a photographer). At operation 820, an average pixel hue of all image pixels displayed on the graphical user interface of the image gallery is determined. Only the pixels of images currently visible within the main window 402 of the image gallery and displayed to a user via a graphical user interface are considered when determining this average.

At operation 830, a first value is assigned to the average pixel hue. At operation 840 the first value is applied to the first selection of the first skin color in order to obtain a second skin color. At operation 850, the second skin color is applied to the skin 440 and displayed on the graphical user interface such that a user of the image gallery (e.g., a customer) may see the second skin color as a background color to the images being viewed on the graphical user interface.

At operation 860, an analysis is performed to determine whether image pixels have been added to or removed from the main window 402 of the image gallery as displayed on the graphical user interface. If the determination made in operation 860 indicates that image pixels have not been added to or removed from the main window 402 of the image gallery as displayed on the graphical user interface, then, as indicated at operation 870, there is no change in skin color as displayed to a user on a graphical user interface. If, however, the determination made in the operation at 860 indicates that image pixels have been added to or removed from the main window 402 of the image gallery as displayed on the graphical user interface, then the analysis proceeds back to the operation at 820 and proceeds forward from there.

The color of the skin as displayed is dependent upon the image pixels displayed within the main window 402 and as visible to a user on a graphical user interface. As image pixels are added to and removed from the main window 402 the analysis may be recalculated.

The dynamic color scheme application creates an aesthetically pleasing skin to accompany images within a photo gallery as displayed to a user on a graphical user interface in real time. Each image displayed may benefit individually or as a gallery from a tailored skin surrounding the image(s), such that it remains aesthetically pleasing as images are added to and removed from the main window 402.

While the foregoing is directed to embodiments described herein, other and further embodiments may be devised without departing from the basic scope thereof. For example, aspects of the present disclosure may be implemented in hardware or software or in a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (for example, read-only memory devices within a computer such as CD-ROM disks readable by a CD-ROM drive, flash memory, ROM chips or any type of solid-state non-volatile semiconductor memory) on which information is permanently stored; and (ii) writable storage media (for example, floppy disks within a diskette drive or hard-disk drive or any type of solid-state random-access semiconductor memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A method for applying and displaying a dynamic color scheme to an image gallery on a graphical user interface, the method sequentially comprising:
   (a) receiving a first selection of a first background color and a plurality of images;
   (b) determining an average pixel hue of all image pixels of the plurality of images displayed at a first scroll position on the graphical user interface of the image gallery, wherein the average pixel hue is determined by individually analyzing each displayed pixel to assign individual hue values;
   (c) assigning a first value to the average pixel hue;
   (d) applying the first value to the first selection of the first background color in order to obtain a second background color;
   (e) displaying the second background color on the graphical user interface; and
   (f) repeating (b) though (e) to dynamically change the first background color as the pixels of different images within the image gallery are displayed in response to detection of a change from the first scroll position to a second scroll position different from the first scroll position on the graphical user interface.

2. The method of claim 1, wherein the first background color and the second background color correspond to an area of the image gallery surrounding the image pixels.

3. The method of claim 1, wherein determining the average pixel hue further includes analyzing the overall brightness and saturation of the image pixels.

4. The method of claim 1, further including adjusting the intensity of the second background color before displaying the second background color on the graphical user interface.

5. The method of claim 1, wherein the first background color comprises a first custom color specified by an owner of the image gallery.

6. The method of claim 1, wherein the first background color is received via a selection from a color palette user interface.

7. The method of claim 6, wherein the color palette user interface is a pop-up window.

8. A computer system for applying and displaying a dynamic color scheme to an image gallery on a graphical user interface, comprising:
   a processor; and
   a memory storing instructions that, when executed by the processor, cause the computer system to sequentially:
      (a) receive a first selection of a first background color and a plurality of images;
      (b) determine an average pixel hue of all image pixels of the plurality of images displayed at a first scroll position on the graphical user interface of the image gallery, wherein the average pixel hue is determined by individually analyzing each displayed pixel to assign individual hue values;
      (c) assign a first value to the average pixel hue;
      (d) apply the first value to the first selection of the first background color in order to obtain a second background color;
      (e) display the second background color on the graphical user interface; and
      (f) repeat (b) though (e) to dynamically change the first background color as the pixels of different images within the image gallery are displayed in response to detection of a change from the first scroll position to a second scroll position different from the first scroll position on the graphical user interface.

9. The computer system of claim 8, wherein the first background color and the second background color correspond to an area of the image gallery surrounding the image pixels.

10. The computer system of claim 8, wherein determining the average pixel hue further includes analyzing the overall brightness and saturation of the image pixels.

11. The computer system of claim 8, further including adjusting the intensity of the second background color before displaying the second background color on the graphical user interface.

12. The computer system of claim 8, wherein the first background color comprises a first custom color specified by an owner of the image gallery.

13. The computer system of claim 8, wherein the first background color is received via a selection from a color palette user interface.

14. The computer system of claim 13, wherein the color palette user interface is a pop-up window.

15. A non-transitory computer-readable medium storing instructions that, when executed by a processor, cause a computer system to apply and display a dynamic color scheme to an image gallery on a graphical user interface, by sequentially performing the steps of:
   (a) receiving a first selection of a first background color and a plurality of images;
   (b) determining an average pixel hue of all image pixels of the plurality of images displayed at a first scroll position on the graphical user interface of the image gallery, wherein the average pixel hue is determined by individually analyzing each displayed pixel to assign individual hue values;
   (c) assigning a first value to the average pixel hue;

(d) applying the first value to the first selection of the first background color in order to obtain a second background color;
(e) displaying the second background color on the graphical user interface; and
(f) repeating (b) though (e) to dynamically change the first background color as the pixels of different images within the image gallery are displayed in response to detection of a change from the first scroll position to a second scroll position different from the first scroll position on the graphical user interface.

16. The non-transitory computer-readable medium of claim 15, wherein the first background color and the second background color correspond to an area of an image gallery surrounding the image pixels.

17. The non-transitory computer-readable medium of claim 15, wherein determining the average pixel hue further includes analyzing the overall brightness and saturation of the image pixels.

18. The non-transitory computer-readable medium of claim 15, further including adjusting the intensity of the second background color before displaying the second background color on the graphical user interface.

19. The non-transitory computer-readable medium of claim 15, wherein the first background color comprises a first custom color specified by an owner of the image gallery.

20. The non-transitory computer-readable medium of claim 15, wherein the first background color is received via a selection from a color palette user interface.

21. The non-transitory computer-readable medium of claim 20, wherein the color palette user interface is a pop-up window.

* * * * *